United States Patent [19]

Chung et al.

[11] Patent Number: 5,205,916
[45] Date of Patent: Apr. 27, 1993

[54] CATHODIC ELECTRODEPOSITION COATINGS CONTAINING AN ANTIOXIDANT ADDITIVE

[75] Inventors: Ding Y. Chung, Rochester Hills; Kenneth S. Kirshenbaum, West Bloomfield, both of Mich.

[73] Assignee: E. I. Du Pont de Nemours and Company, Wilmington, Del.

[21] Appl. No.: 805,042

[22] Filed: Dec. 11, 1991

[51] Int. Cl.$^5$ .............. C25D 13/06; C08L 63/00; C08K 5/36; C08K 5/13
[52] U.S. Cl. ................ 204/181.7; 524/81; 524/291; 524/901; 523/453; 523/456; 523/461; 528/45
[58] Field of Search .............. 523/453, 456, 461; 528/45; 524/901, 291, 81; 204/181.7

[56] References Cited

U.S. PATENT DOCUMENTS

| | | | |
|---|---|---|---|
| 3,922,253 | 11/1975 | Jerabek et al. | 260/77.5 TB |
| 4,076,764 | 2/1978 | Bauer | 523/456 |
| 4,137,140 | 1/1979 | Belanger | 204/181 C |
| 4,419,467 | 12/1983 | Wismer et al. | 523/4.4 |
| 4,468,307 | 8/1984 | Wismer et al. | 204/181 C |
| 4,551,488 | 11/1985 | Leech et al. | 523/453 |
| 5,049,249 | 9/1991 | Chung et al. | 523/415 |

Primary Examiner—Paul R. Michl
Assistant Examiner—Tae H. Yoon
Attorney, Agent, or Firm—Hilmar L. Fricke

[57] ABSTRACT

An improved aqueous electrocoating composition having a binder of an epoxy-amine adduct and a blocked polyisocyanate crosslinking agent; wherein the improvement is the use of an antioxidant additive which is a combination of a phenolic antioxidant and a sulfur-containing antioxidant. The additive reduces overbake yellowing of the composition and the intercoat delamination of the composition and the topcoat upon exterior exposure.

8 Claims, No Drawings

CATHODIC ELECTRODEPOSITION COATINGS CONTAINING AN ANTIOXIDANT ADDITIVE

BACKGROUND OF THE INVENTION

This invention is directed to a cathodic electrocoating composition and in particular to a cathodic electrocoating composition containing an antioxidant additive which reduces the yellowing of the electrocoated film and delamination between the topcoat and the electrocoated film.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a coating having the desired thickness is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Yellowing of the electrodeposited film when the film is overbaked and delamination between the topcoat and the electrodeposited film on weathering have been serious problems for automotive manufacturers which have been overcome by the improved electrocoating composition of this invention.

SUMMARY OF THE INVENTION

An improved aqueous electrocoating composition having a binder of an epoxy-amine adduct and a blocked polyisocyanate crosslinking agent; wherein the improvement is the use of an antioxidant additive, which is a combination of a phenolic antioxidant and a sulfur-containing antioxidant.

DETAILED DESCRIPTION OF THE INVENTION

The antioxidant additive which is a mixture of a phenolic antioxidant and a sulfur-containing antioxidan that is used in the electrocoating composition significantly reduces yellowing of an electrodeposited film if the film is over baked. Overbaking occurs when the film is baked at higher than normal baking temperatures or for longer than normal baking times that are used to cure the coating or film. Overbaking may occur at times in an auto or truck assembly line. Also, intercoat delamination of the electrodeposited primer film and the topcoat on weathering has been substantially reduced. It is surprising and unexpected that such a combination of phenolic antioxidant and sulfur containing antioxidant reduces yellowing and delamination. It was found that a combination of antioxidants was needed to produce these results and the combination surprisingly has a synergistic effect.

The antioxidant additive is used in an amount of about 0.1–10% by weight, based on the weight of the binder of the electrocoating composition. Preferably, each antioxidant is used at a level of about 0.1–2% by weight, based on the weight of the binder, and more preferably, at about 0.25–1% by weight, based on the weight of the binder.

Typical phenolic antioxidants are sterically hindered phenols and include the triazine of a hindered phenol which is commercially available as "Cyanox" 1790 from American Cyanamid and is the preferred phenolic antioxidant. Other useful phenolic antioxidants include 2,2'-methylene-bis(4-methyl-6-t-butylphenol), 1,3,5-trimethyl-2,4,6-tris(3,5-di-t-butyl-4-hydroxybenzyl)benzyne and tetrakis[methylene-3-(3,5-di-t-butyl-4-hydroxyphenyl)propionate]methane.

Typical sulfur containing antioxidants include alkylthioesters such as dilaurylthiodipropionate which is commercially available as "Cyanox" LTDP from American Cyanamid, and distearylthiodipropionate which is commercially available as "Cyanox"STDP from American Cyanamid. Other useful sulfur containing antioxidants include dioctylthiodipropionate and sulfur-containig acrylic.

The antioxidant additive can be incorporated into the electrocoating composition at most any stage of the manufacture of the composition. It can be added, for example to the formulated composition, to the pigment dispersion, to the aqueous emulsion of an epoxy amine adduct blended with the crosslinking agent.

Most principal emulsions used in an electrocoating composition comprise an aqueous emulsion of an epoxy amine adduct blended with a cross-linking agent which has been neutralized with an acid to form a water soluble product. The preferred resin is the typical epoxy-amine adduct of the prior art. These resins are generally disclosed in U.S. Pat. No. 4,419,467 which is incorporated herein by reference.

Preferred crosslinkers used in the electrocoating composition also are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, and caprolactams which block the isocyanate functionality i.e. the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy amine adduct and the blocked isocyanate are the principal resinous ingredients in the electrocoating composition and are usually present in amounts of about 30 to 50 percent by weight of solids. To form an electrocoating bath which is an aqueous dispersion, the solids are reduced with an aqueous medium.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used. After grinding, the particle size of the pigment should be as small as practical, generally, the particle size is about 6-8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have also been found to adversely affect coalescence and flow.

The coating compositions of the invention can contain optional ingredients such as wetting agents, surfactants, wetting agents defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the resin solids.

The following example illustrates the invention. All parts and percentages are on a weight basis unless otherwise indicated.

EXAMPLE

Preparation of Chain Extended Polyepoxide

The following ingredients were charged into a suitable reaction vessel: 1478 parts EPON 828 ® (epoxy resin of diglycidyl ether of Bisphenol A from Shell Chemical Company having an epoxy equivalent weight of 188); 533 parts ethoxylated Bisphenol A having a hydroxy equivalent weight of 247 (SYNFAC 8009 ® from Milliken Company); 427 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine (reaction product of dithylenetriamine and methyl isobutyl ketone at 72.7% solids) and 143 parts of methyl ethanol amine were added. The resulting mixture was held at 120° C. for 1 hour and then 727 parts of methyl isobutyl ketone were added. The resulting resin solution had a non-volatile content of 75%.

Preparation of Quaternizing Agent

|  | Parts by Weight | NV* |
|---|---|---|
| Blocked Isocyanate Solution (2-Ethylhexanol half capped toluene diisocyanate in methyl isobutyl ketone) | 320.0 | 304.0 |
| Dimethylethanol amine | 87.2 | 87.2 |
| Aqueous lactic acid solution | 117.6 | 88.2 |
| 2-Butoxyethanol | 39.2 | |
| Total | 564.0 | 479.4 |

*Non-Volatiles

The quaternizing agent was prepared by adding dimethylethanol amine to the blocked isocyanate solution in a suitable reaction vessel at ambient temperature. An exothermic reaction occurs and the reaction mixture was stirred for one hour and held at a temperature of 80° C. Lactic acid solution was added followed by the addition of 2-butoxyethanol. The reaction mixture was stirred for an additional hour at 65° C. to form the quaternizing agent.

Preparation of Pigment Grinding Vehicle

|  | Parts by Weight | NV* |
|---|---|---|
| EPON 829 ® (epoxy resin of diglycidyl ether of Bisphenol A from Shell Chemical Company having an epoxy equivalent weight of 192-203) | 710.0 | 682.0 |
| Bisphenol A | 289.6 | 289.6 |
| Blocked isocyanate solution (described above) | 406.0 | 386.1 |
| Quaternizing Agent (prepared above) | 496.3 | 421.9 |
| Deionized water | 71.2 | |
| 2-Butoxyethanol | 1095.2 | |
| Total | 3068.3 | 1779.6 |

EPON 829 ® and Bisphenol A were charged under a nitrogen atmosphere to a suitable reaction vessel and heated to 150°-160° C. to initiate an exothermic reaction. The reaction mixture was cooled to 120° C. and the blocked isocyanate solution was added. The temperature of the reaction mixture was held at 110°-120° C. for one hour, followed by the addition of 2-butoxyethanol. The reaction mixture then was cooled to 85°-90° C., homogenized and then the deionized water was added followed by the addition of the Quaternizing agent. The resulting mixture had a solids content of about 58%.

Preparation of Pigment Paste

|  | Parts by Weight | NV |
|---|---|---|
| Pigment Grinding Vehicle (prepared above) | 171.33 | 99.37 |
| Deionized water | 400.05 | |
| Carbon black pigment | 22.36 | 22.36 |
| Aluminum silicate pigment | 48.44 | 48.44 |
| Lead pigment | 22.36 | 22.36 |
| Dibutyl tin oxide | 14.91 | 14.91 |
| Titanium dioxide pigment | 264.57 | 264.57 |
| Total | 944.02 | 472.01 |

The above constituents were charged into a conventional sand mill and ground to a No. 7 Hegman fineness.

Preparation of Emulsion: Example

|  | A | B | C | D | E | F | G |
|---|---|---|---|---|---|---|---|
| Chain Extended polyepoxide (prepared above) | 840 | 831 | 831 | 831 | 823 | 823 | 823 |
| "Cyanox" 1790 | 0 | 5 | 0 | 2.5 | 10 | 0 | 5 |
| "Cyanox" LTDP | 0 | 0 | 5 | 2.5 | 0 | 0 | 0 |
| "Cyanox" STDP | 0 | 0 | 0 | 0 | 0 | 10 | 5 |
| Capped Isocyanate Crosslinker[1] | 528 | 526 | 526 | 526 | 523 | 523 | 523 |
| "Downol PPH" from Dow | 10 | 10 | 10 | 10 | 10 | 10 | 10 |
| Surfactant[2] | 15 | 15 | 15 | 15 | 15 | 15 | 15 |
| Deionized Water | 1349 | 1355 | 1355 | 1355 | 1361 | 1361 | 1361 |
| Lactic Acid | 35 | 35 | 35 | 35 | 35 | 35 | 35 |
| Total | 2777 | 2777 | 2777 | 2777 | 2777 | 2777 | 2777 |

[1]Polyurethane crosslinker formed from half-capping toluene diisocyanate (80/20 2,4/2,6 isomer mixture) with 2-hexyloxy ethanol and reacting this product with tri methylol propane in a 3:1 molar ratio. The crosslinker is present as a 70 percent solids solution in methyl isobutyl ketone.
[2]Surfactant is a mixture of 120 parts "Amine C" from Ciba-Geigy, 120 parts acetylenic alcohol, commercially available as "Surfynol 104", 120 parts of 2-butoxy ethanol and 221 parts by weight of deionized water and 19 parts glacial acetic acid.

The polyepoxide, the antioxidants, polyurethane crosslinker, "Downol PPH", lactic acid, and surfactant were thoroughly mixed and then deionized water was added under agitation. The emulsions were stable.

Preparation of an Electrocoating Baths

|  | Parts by Weight |
|---|---|
| Emulsion A-G (prepared above) | 1689 |
| Pigment Paste (prepared above) | 418 |
| Deionized water | 1893 |
| Total | 4000 |

The electrocoating baths were prepared by blending the above ingredients together and kept under constant stirring. A separate set of three zinc phosphated coated cold-rolled steel panels were cathodically electrocoated in each of the baths A-D at 200 volts for 2 minutes at a bath temperature of 30° C. and to a film build between 0.73 and 0.78 mil. All twelve panels were then baked in a gas-fired oven at 215° C. for 30 minutes.

The panels were then measured for yellowing with a Du Pont Metallic Absolute Colorimeter. The b-value of the L,a,b, color coordinates was measured. The results are an average of the readings of the three panels per bath. The lower the b-value, the lower the degree of yellowing. Panels from bath D which contained the combination of the phenolic antioxidant and the sulfur containing antioxidant had the lowest lever of yellowing.

| Yellowing Values After 30 Minute at 215° C. Bake | | | |
|---|---|---|---|
| Bath: | A | B | C | D |
| | −0.32 | −0.58 | −0.13 | −1.28 |

In a second experiment, one zinc phosphated coated cold-rolled steel panel was cathodically electrocoated in each of baths A and E-G at 280-320 volts for 2 minutes at a bath temperature of 30° C. The four panels were baked in a gas-fired oven at 215° C. for 10 minutes metal temperature, then topcoated with 1.84 mil of a clear topcoat fortified against UV wavelengths below approximately 380 nm. The panels were sent to Florida for eight weeks of climatic exposure.

| Bath | Florida Exposure Results | |
|---|---|---|
|  | B-Value | Delamination Rating* |
| A | 2.55 | 0 |
| E | 0.36 | 5 |
| F | 0.28 | 1 |
| G | −1.35 | 8 |

*Delamination rating 0 = total failure, 10 = perfect pass.

The above results show that the panels from Bath G which contained the combination of the phenolic antioxidant and the sulfur containing antioxidant had the lowest level of yellowing and the highest delamination rating.

We claim:

1. In a cathodic electrocoating composition comprising an aqueous carrier having dispersed therein a film forming binder comprising an epoxy-amine adduct and a blocked aromatic polyisocyanate crosslinking agent; wherein the improvement comprises the use of about 0.1-10% by weight, based on the weight of the binder, of an antioxidant mixture consisting of a phenolic antioxidant and a sulfur containing antioxidant; whereby the antioxidant mixture substantially reduces yellowing of the composition after electrodeposition to a substrate and subsequent baking and substantially reduces delamination of a topcoat applied to the electrodeposited composition.

2. The cathodic electrocoating composition of claim 1 wherein the antioxidant mixture consists of about 0.1-2% by weight, based on the weight of the film forming binder, of the phenolic antioxidant and 0.1-2% by weight, based on the weight of the binder of the sulfur containing antioxidant.

3. The cathodic electrocoating composition of claim 2 wherein the sulfur containing antioxidant is an alkylthioester and the phenolic antioxidant is a sterically hindered phenol.

4. The cathodic electrocoating composition of claim 2 wherein the phenolic antioxidant is a triazine of a hindered phenol and the sulfur containing antioxidant is distearylthiodipropionate or dilaurylthiopropionate.

5. In a method of preparing a cathodic electrocoating composition comprising the following steps:
(a) preparing an epoxy-amine adduct;
(b) preparing a blocked aromatic polyisocyanate crosslinking agent;
(c) blending the epoxy-amine adduct with the blocked aromatic polyisocyanate crosslinking agent;
(d) neutralizing the epoxy-amine adduct within an organic acid to form an emulsion of film forming binder;
(e) adding about 0.1-10% by weight, based on the weight of this binder, of an antioxidant mixture to the electrocoating composition consisting of a phenolic antioxidant and a sulfurcontaining antioxidant; whereby the antioxidant mixture substantially reduces yellowing of the composition after electrodeposition to a substrate and subsequent baking and substantially reduces delamination of a topcoat applied to the electrodeposited composition.

6. The method of claim 5 wherein th antioxidant mixture consists of about 0.1-2% by weight, based on the weight of the film forming binder, of the phenolic antioxidant and 0.1-2% by weight, based on the weight of the binder, of the sulfur containing antioxidant.

7. The method of claim 6 wherein the sulfur containing antioxidant is an alkylthioester and the phenolic antioxidant is a sterically hindered phenol.

8. The method of claim 7 wherein the phenolic antioxidant is a triazine of a hindered phenol and the sulfur containing antioxidant is distearylthiodipropionate or dilaurylthiodipropionate.

* * * * *